United States Patent [19]
Case

[11] 3,804,391
[45] Apr. 16, 1974

[54] CUTTING TORCH GUIDE ATTACHMENT

[75] Inventor: William R. Case, Long Beach, Calif.

[73] Assignee: June L. Alexander, Phoenix, Ariz.; a part interest

[22] Filed: Oct. 4, 1972

[21] Appl. No.: 294,765

[52] U.S. Cl. .............................. 266/23 L, 33/27 C
[51] Int. Cl. ........................... B23k 5/00, B43i 9/00
[58] Field of Search ........ 266/23, 23 A, 23 B, 23 C, 266/23 D, 23 E, 23 L, 23 M, 23 R; 33/27 C, 33/158, 159, 163

[56] References Cited
UNITED STATES PATENTS

| | | | |
|---|---|---|---|
| 2,688,190 | 9/1954 | Hayes | 33/27 C |
| 2,523,237 | 9/1950 | Richardson | 33/27 C |
| 3,701,515 | 10/1972 | Field | 266/23 K |
| 2,483,294 | 9/1949 | Miner | 266/23 L |
| 2,869,237 | 1/1959 | Berge | 33/159 |
| 2,489,061 | 11/1949 | Thompson | 33/27 C |
| 2,324,041 | 7/1943 | Suverkrop | 33/27 C |
| 627,411 | 6/1899 | Grove | 33/27 C |
| 2,323,298 | 7/1943 | Cook | 266/23 L |

*Primary Examiner*—Harrison L. Hinson
*Attorney, Agent, or Firm*—Miketta, Glenny, Poms & Smith

[57] ABSTRACT

A device which may be releasably attached to a hand-operated oxy-acetylene or similar type torch to facilitate cutting of arcs or circles in a workpiece by providing a pivot point about which the cutting tip may be moved and in which the pivot point is movable relative to the cutting tip with extreme precision so as to permit the device to be used to cut holes in metal of great accuracy.

10 Claims, 5 Drawing Figures

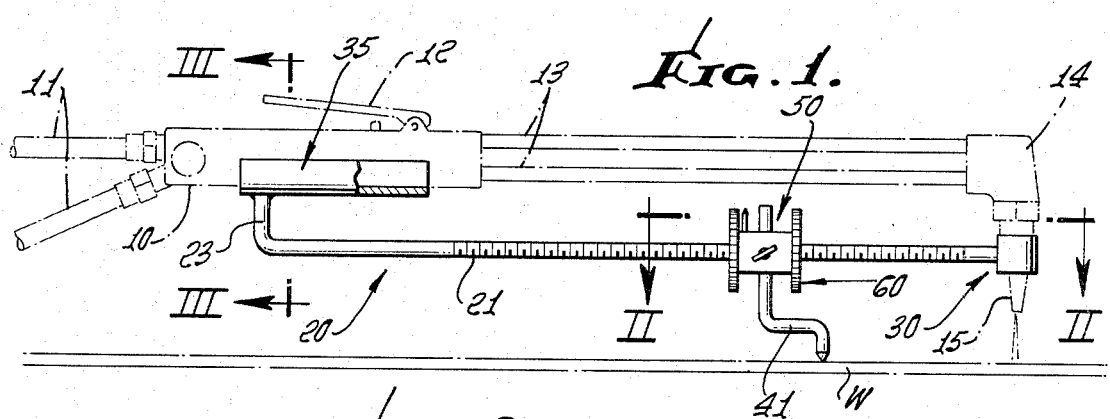
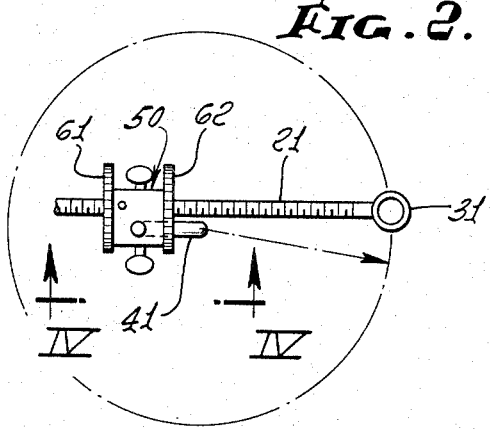
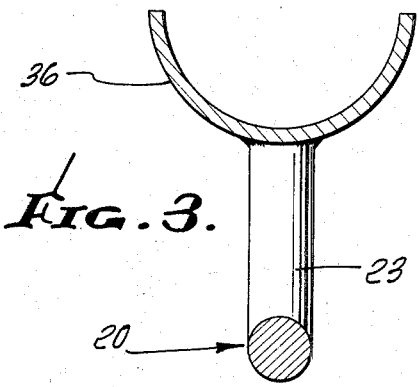
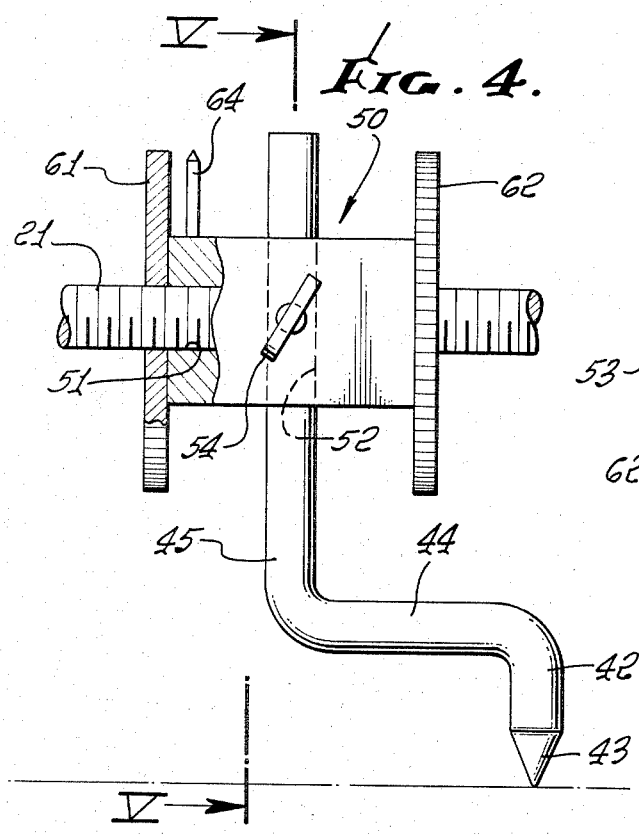
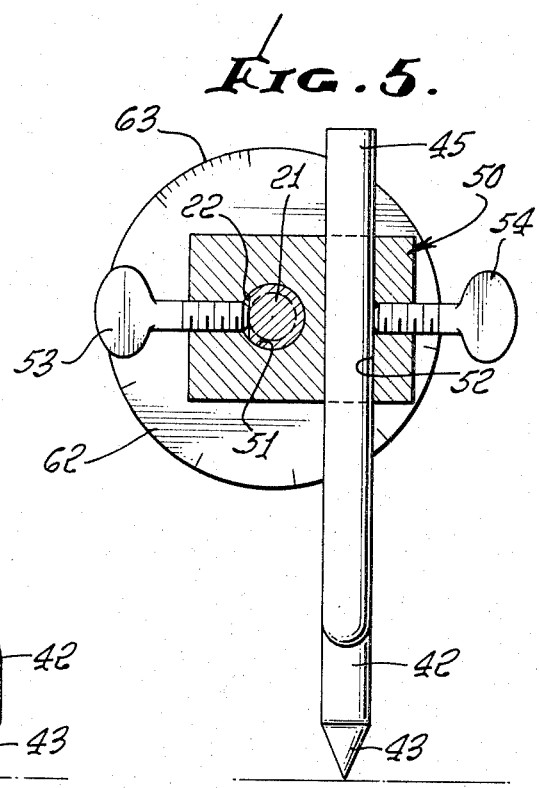

CUTTING TORCH GUIDE ATTACHMENT

BACKGROUND AND PRIOR ART:

It has long been recognized that it is extremely difficult even for a skilled welder to accurately cut an arcuate hole or circle in metal workpieces by simply free-hand movement of the cutting tip relative to the workpiece. Yet where a hole in a workpiece is required having a diameter of relatively close tolerance, it has often been recognized as necessary to use various machine tools to cut such hole because of the inaccuracy of the oxy-acetylene torch even though the latter method would be cheaper. The realization of this problem is manifested in the attempted solution which may be found in a number of prior art patents including, U.S. Pat. Nos. 1,792,317, 2,323,298, 2,483,284, 2,489,061, 2,596,133, 2,688,190, 2,743,101, and 3,139,471. In each of these prior art patents, there is disclosed a cutting torch attachment which provides a compass or pivot point adjustable relative to the cutting tip so that when affixed to the torch, the tip may be moved in an arcuate path relative to the workpiece to facilitate accurate cutting of a circle. While these devices are certainly an improvement over free-hand cutting of circular holes with an oxy-acetylene torch, they are generally lacking in the precision obtainable by the device of the present invention. One of the disadvantages of these prior art devices is the provision of a scale having graduations thereon which after substantial use of the device are likely to be impaired or otherwise obscured preventing the compass point from being spaced from the cutting tip a precisely controlled distance which would permit accurate holes to be cut. This is particularly true where such graduations are permanently affixed on, for example, the gas feed tubes of the torch. Other disadvantages of these prior art devices will be seen by studying the above-identified patents.

SUMMARY OF THE INVENTION:

It is an object of the present invention to provide a cutting torch guide attachment which is readily removable from the torch, is simple to adjust, firmly releasably locks the compass point relative to the torch tip, and permits extremely precise and accurate cutting of holes having a desired diameter. Other objects include the provision of such attachment which is relatively simple to use and inexpensive to manufacture. The device of the present invention also includes the advantage wherein the compass point may be approximately positioned relative to the cutting tip permitting a preliminary hole to be cut which may be accurately measured by a conventional scale and then precisely positioned by the rotation of a knob which moves the compass point relative to the tip and wherein rotation or partial rotation of the knob corresponds to an increment of lineal movement of the compass point that corresponds to units in the English or metric systems of measurement.

Generally, in the preferred embodiment of the present invention, there is provided a circle or arc guide attachment for a cutting torch having the conventional cutting head or tip, feed pipes and a handle, the attachment comprising an elongated threaded bar, a cutting head or tip support fixedly mounted to one end of the bar and having an opening through which the top extends, a cradle fixedly mounted at the opposite end of said bar for supporting the torch handle, a compass point or pivot pin for engagement with a workpiece, a sliding block having a first throughbore for receiving the bar and a second throughbore angularly disposed thereto for receiving the compass pin, and at least one knurled nut threadedly engaging the rod and positioned on one side of the sliding block so that rotation of the nut will position the sliding block and thus the compass point at selected distances from the cutting tip to permit the torch to be pivoted relative to the workpiece to cut an arcuate hole in the piece.

BRIEF DESCRIPTION OF THE DRAWINGS:

FIG. 1 is a side elevation view of an exemplary embodiment of a circle or arc guide attachment for use with an oxy-acetylene cutting torch as shown in phantom lines;

FIG. 2 is a sectional view taken along the plane II—II of FIG. 1;

FIG. 3 is a sectional view taken along the plane III—III of FIG. 1;

FIG. 4 is a sectional view taken along the plane IV—IV of FIG. 2; and

FIG. 5 is a sectional view taken along the plane V—V of FIG. 4.

DETAILED DESCRIPTION OF THE PREFERRED EMBODIMENT:

With reference now to the drawing, there is shown an exemplary embodiment of a circle or arc guide attachment for an oxy-acetylene or similar type cutting torch. The oxy-acetylene cutting torch is illustrated in phantom lines in FIG. 1 of the drawing and will be seen to comprise a handle 10, flexible oxygen and acetylene gas lines indicated at 11, an oxygen feed lever 12, gas feed tubes or pipes 13 extending forwardly from the cylindrical handle 10 to a cutting head 14 which includes a cutting tip 15. It will be immediately apparent to those skilled in the art that the oxy-acetylene torch described is of typical conventional construction. It will be equally apparent to those skilled in the art that other types of cutting torches may be employed with the circle or arc guide attachment of the present invention.

Generally, the cutting torch guide attachment comprises an elongated threaded bar indicated generally at 20, a cutting tip support indicated at 30, a cradle indicated generally at 35, a compass pin indicated generally at 40, a sliding block indicated generally at 45, and means for engaging the rod and positioning the sliding block indicated generally at 55.

Now, with greater particularity, attention is drawn to the elongated threaded bar 20 which may be of metal or other suitably rigid material and which is threaded at least over a portion of its length as shown at 21. In the particular embodiment shown, one of the advantageous features of the present invention is the provision of a thread pitch on the threaded bar of 20 threads per inch for reasons to be explained more fully hereinafter. Of course, as will also be explained hereafter, other thread pitches may be advantageously used in obtaining the accuracy desired. With reference to FIG. 5, it should be noted that one face of the elongated threaded bar is flat as indicated at 22 for reasons also to be explained more fully hereinafter.

At the forward end of the elongated threaded bar 20 there is provided the cutting tip support 30 which is fixedly mounted to the bar and which may comprise a ring 31 as seen best in FIG. 2. It will be readily appreciated that inasmuch as the conventional oxy-acetylene cutting torch has a conically shaped cutting tip 15, the cutting tip may be inserted into the ring or cylinder 31 so that the forward end of the torch is supported by such ring. At the opposite end of the elongated threaded bar there is provided the cradle 35 that is disposed in a horizontal plane, when the device is in use, and is fixedly mounted to an upwardly extending portion 23 of the threaded bar 20 so that the cradle is vertically spaced from the bar 20. As seen best in FIG. 3, the cradle may comprise a semi-cylindrical member 36 having an inside diameter which is substantially equal to the external diameter of the cylindrical torch handle 10 so that the handle and cradle may be positioned in registry and the welder's hand may firmly grasp the cradle and handle together so as to hold the guide attachment with the torch for concurrent movement.

Movement of the torch tip 15 in an arcuate path is relative to a point on a workpiece W shown in phantom lines in FIG. 1. The pivot point is determined by the compass or pivot point or pin 40 which in the exemplary embodiment comprises a pin 41 having a first vertical portion 42 (see FIG. 4) with a sharp point 43, a second horizontally disposed portion 44, and a third vertically disposed portion 45. It will be appreciated that by providing a dogleg in the pivot point 41 so that the point 43 is radially disposed from the axis of the portion 45 and the welder who has marked the center point on the workpiece will be more able to set the point 43 on the mark since his vision will not be obscured by the sliding block 50.

The sliding block 50 has a first or horizontal throughbore 51 as seen best in FIGS. 4 and 5 for receiving the threaded bar 20. The throughbore has an inside diameter which is greater than the external threaded diameter of the threaded bar 20 so that it may be easily slid along the length of the bar. The throughbore may be cylindrical or, although not shown, may have a flat inner face corresponding to the flat face 22 of the bar 20 so that the sliding block is not rotatable relative to the bar. A second throughbore 52 is also disposed in the sliding block 50 and is preferably disposed at a right angle to the first throughbore 51 and is adapted to receive the vertical portion 45 of the compass point 40. The sliding block 50 may be manually releasably fixed relative to the threaded bar by means of a fastener which in the exemplary embodiment comprises the screw 53 threadably mounted in a horizontal position in the sliding block so that the forward end of the screw 53 bears against the flat face 22 of the threaded bar 20 thereby preventing the sliding block from relative longitudinal movement with respect to the bar.

The compass point 40 may be made vertically adjustable relative to the sliding block so as to move the end of the cutting tip 15 toward or away from the workpiece W. The pin may be fixed relative to the sliding block by means of a fastener such as the screw 54 which is disposed in a threaded opening so that the forward end of the screw bears against the portion 45 of the compass point 40 thereby locking the sliding block relative to the pin.

The means 60 for positioning the sliding block relative to the cutting tip 15, in the exemplary embodiment, may comprise at least one knurled nut 61 positioned on one side of the block and threadably engaging the threaded portion 21 of the bar 20 so that rotation of the nut advances the nut along the bar and thereby longitudinally moves the sliding block 50. The exemplary embodiment includes a second knurled nut 62 positioned on the opposite end of the sliding block 50 and assists in fixing the sliding block relative to the threaded bar 20 at its desired location. Either or both of the knurled nuts 61, 62 may be provided with graduation marks 63 around its periphery for use in conjunction with a pointer 64 fixedly mounted on the sliding block 50 to provide a reference point for rotation of the knurled nuts to determine the amount of advance of the sliding block. In the exemplary embodiment illustrated in FIG. 5, there are provided 100 graduations on the knurled nut so as to subdivide one complete rotation of the knurled nut into 100 increments. The division or graduation of a complete circle into 100 increments for use in conjunction with a threaded bar having a pitch of 20 threads per inch results in each graduation corresponding to 0.0005 of an inch.

In operation, the welder will locate a point and suitably mark such point on the workpiece W and make a second mark on the workpiece at the desired radius of the arc or circle to be cut. By placing the point 43 of the compass pin 40 on the center mark, one of the knurled nuts 61 or 62 may be backed away from the sliding block and the adjacent knurled nut may be rotated so as to move the tip relative to the point until it is in registry with the second mark defining the arc to be cut. The second nut may then be rotated so as to firmly engage the opposite end of the sliding block providing a partial restraint against movement of the sliding block relative to the threaded bar 20. If it is desired to fix this radius, the screw 53 may be tightened so as to clamp the sliding block relative to the threaded bar more firmly. It will be appreciated that this setup will provide only a rough approximation of the diameter of the hole to be cut or the radius of the arcuate slot which may be adequate for some purposes.

To obtain fine and precise positioning of the tip relative to the center point so as to cut a hole of precise diameter, a different setup may be employed. In this precise adjustment method, a scrap piece of material is used and a center point and a second mark at the desired approximate radius is laid out on the scrap piece. The torch is then ignited and properly adjusted to cut a slot in the scrap piece, such adjustment of the cutting flame being determined by the type of material as well as its thickness. An arcuate slot may then be cut and after the material cools, a scale may be employed to precisely measure the distance between the center point and the outer edge of the slot. Now, to obtain the precise diameter required, one of the two knurled nuts 61, 62 are backed off away from the sliding block depending upon whether the diameter is desired to be enlarged or decreased. The second knurled nut is then rotated and since the threaded bar has a pitch of 20 threads per inch, a full rotation of the knurled nut will increase (or decrease) the radius of the circle to be cut by 0.05 inches which of course corresponds to an increase (or decrease) of the diameter of the circle of 0.10 inches. If, for example, it is found that the precise diameter desired is, 0.005 of an inch greater or less than the diameter measured to the outside edge of the hole, this precise movement may be performed by noting the position of the knurled nut graduation corresponding to the pointer 64 and then rotating the knurled nut 5 division or graduation marks which will increase or decrease the diameter of the circle by 0.010 of an inch. The sliding block is then clamped relative to the threaded bar 20 by means of the screw 53 and the setup is then complete. The welder will then make the desired center mark on the workpiece and may cut circles of precise diameter as desired.

It will be appreciated by those skilled in the art that if it is desired to employ a cutting attachment wherein the diameter of a circle to be cut is preferably measured in terms of fractions of an inch, rather than in decimals, a threaded rod may be used having a pitch of, for example, 16 threads per inch with a knurled nut having 8 graduation marks around its periphery so that one rotation of the knurled nut will change the diameter of a circle to be cut by one-eighth of an inch. It will further be appreciated by those skilled in the art that various thread pitches may be used on the threaded bar 20 in connection with variously graduated knurled nuts so that different combinations, for example, in the metric system, may be available for use by the welder with great convenience and simplicity.

It has been found in practice that the cutting torch guide attachment of the present invention can be used to cut holes of such close tolerance as to approximate that which may be accomplished on a lathe or boring mill. The preciseness of the attachment permits holes to be cut with sufficient accuracy that the hole may be tapped for a pipe fitting particularly where the diameter of the hole is less than minute. The cutting attachment illustrated in the drawings, which are approximately to scale, may be used to cut holes having diameters ranging from nine-sixteenths of an inch to 36 inches or larger. Moreover, the torch with which the attachment may be used may be an oxy-acetylene torch, a plasma cutting torch, a carbon arc torch, a laser beam, or any other gas fuel or electric-gas torch.

Having thus described the device of the present invention in considerable detail with reference to a specific embodiment of the invention, it will be apparent to those having ordinary skill in the art that various modifications and variations may be made without departing from the scope of the invention. It will also be appreciated that the objects set forth are met by the exemplary embodiment of the cutting attachment which has been described with particular reference to the advantages of precision cutting.

I claim:

1. A circle or arc guide attachment for an oxy-acetylene or similar type cutting torch having a cutting tip, feed pipes and a handle, comprising:
   an elongated threaded bar;
   a cutting tip support fixedly mounted to one end of said bar and having an opening through which the cutting tip extends;
   a cradle fixedly mounted at the opposite end of said bar for supporting the torch handle;
   a compass pin for engagement with a workpiece;
   a sliding block having a first throughbore for receiving said bar and a second throughbore angularly disposed to said first throughbore for receiving said compass pin;
   at least one knurled nut means threadedly engaging said rod and positioned on one side of said block to position said sliding block and said compass pin at selected distances from said cutting tip upon rotation of said nut and to assist in maintaining said sliding block after it is adjusted to its desired position to permit said torch to be pivoted relative to said workpiece to cut an arcuate hole in said piece; and
   a second knurled nut means positioned on the opposite end of said sliding block to assist in maintaining the sliding block in fixed position after it is adjusted to its desired position during use of the torch and to position said sliding block and said compass pin at selected distances from said cutting tip.

2. The guide attachment of claim 1 wherein said elongated threaded bar has a pitch of 20 threads per inch, whereby one rotation of either of said knurled nut means change the diameter of the circle to be cut by 0.10 inches.

3. The attachment of claim 2 wherein said knurled nut means are provided with 100 division marks about its periphery and said sliding block carries a pointer whereby adjustment of the circle diameter may be made to 0.001 of an inch.

4. The attachment of claim 1 wherein said threaded rod has a pitch of 16 threads per inch and said knurled nut means have 8 graduation marks around their periphery and said sliding block carries a pointer whereby one rotation of either of said knurled nut means changes diameter of a circle to be cut by one-eighth of an inch.

5. The attachment of claim 1 wherein said sliding block is provided with fastener means for securing the sliding block relative to the threaded rod when set in its desired position.

6. The attachment of claim 5 wherein said threaded rod is provided with one longitudinally extending flat face and said threaded means comprises a screw threadedly received in said block and positioned so that the forward end of said screw will bear against the flat face of said rod.

7. The attachment of claim 1 wherein said cradle comprises a semi-cylindrical member attached at one end to said threaded rod and having a diameter approximately equal to the outer diameter of the torch handle so that said member engages the torch handle and may be held with said handle by the welder.

8. The attachment of claim 7 wherein said compass pin is vertically adjustably mounted in said sliding block for selectively positioning the torch relative to the workpiece when the compass point rests on the workpiece.

9. In an improved circle or arc guide attachment for an oxy-acetylene or similar type cutting torch having a cutting tip, feed pipes and a handle, comprising an elongated threaded bar, a cutting tip support fixedly mounted to one end of the bar and having an opening through which the cutting tip extends, a cradle fixedly mounted at the opposite end of the bar for supporting the torch handle, a compass pin for engagement with a workpiece, and a sliding block having a first throughbore for receiving the bar and a second throughbore angularly disposed to the first throughbore for receiving the compass pin; the improvement comprising
   first adjusting means including a first knurled nut threadedly engaging said rod and positioned on one side of the block to position the sliding block and the compass pin at selected distances from the cutting tip by rotating said first knurled nut, said first adjusting means driving said sliding block in a direction from the first adjusting means to the sliding block, said means also serving to lock said sliding block when said sliding block has been driven toward said first adjusting means; and second adjusting means including a second knurled nut threadedly engaging said rod and positioned on the other side of the block to alternatively position said sliding block and said compass pin at selected distances from said cutting tip by rotation of said second knurled nut, said second means driving said sliding block toward said first adjusting means and in a direction from said second means to said sliding block; said second adjusting means serving also to lock said sliding block when said sliding block has been driven by said first means.

10. The improvement of claim 9 wherein both of said first and second knurled nuts are provided with markings calibrated to the pitch of the elongated threaded bar so that either the first means or the second means may be used to accurately position the sliding block.

* * * * *